United States Patent
Agrawal et al.

(10) Patent No.: US 9,338,166 B2
(45) Date of Patent: May 10, 2016

(54) SYSTEM AND METHOD FOR A SINGLE REQUEST AND SINGLE RESPONSE AUTHENTICATION PROTOCOL

(75) Inventors: Sunil Agrawal, Milpitas, CA (US); Matthew J. Poling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1848 days.

(21) Appl. No.: 12/264,830

(22) Filed: Nov. 4, 2008

(65) Prior Publication Data

US 2013/0124856 A1    May 16, 2013

(51) Int. Cl.
*G06F 7/04* (2006.01)
*G06Q 40/00* (2012.01)
*H04K 1/00* (2006.01)
*H04L 29/06* (2006.01)
*G06F 21/41* (2013.01)
*G06F 21/31* (2013.01)
*H04L 9/08* (2006.01)

(52) U.S. Cl.
CPC .............. *H04L 63/10* (2013.01); *G06F 21/31* (2013.01); *G06F 21/41* (2013.01); *H04L 9/0844* (2013.01); *H04L 67/42* (2013.01); *H04L 2463/103* (2013.01)

(58) Field of Classification Search
CPC ... G06F 21/6245; G06F 21/31; H04L 67/306; H04L 67/42; H04L 9/0844
USPC ............................................ 726/9, 3; 705/72
See application file for complete search history.

(56) References Cited

U.S. PATENT DOCUMENTS

| | | | |
|---|---|---|---|
| 5,560,008 A * | 9/1996 | Johnson et al. | 726/5 |
| 6,330,670 B1 | 12/2001 | England et al. | |
| 6,345,256 B1 | 2/2002 | Milsted et al. | |
| 6,424,715 B1 | 7/2002 | Saito | |
| 6,519,700 B1 * | 2/2003 | Ram et al. | 713/193 |
| 6,647,388 B2 * | 11/2003 | Numao | G06F 21/6218 |
| 6,859,878 B1 * | 2/2005 | Kerr et al. | 713/183 |
| 6,862,592 B1 * | 3/2005 | Flenniken et al. | |
| 6,885,748 B1 | 4/2005 | Wang | |
| 7,308,717 B2 * | 12/2007 | Koved et al. | 726/27 |
| 7,340,438 B2 * | 3/2008 | Nordman et al. | 705/64 |
| 7,526,812 B2 * | 4/2009 | DeYoung | H04N 7/162 380/51 |
| 7,882,035 B2 * | 2/2011 | Cottrille et al. | 705/59 |
| 7,937,750 B2 * | 5/2011 | Mahalal | G06F 21/10 455/410 |
| 7,979,700 B2 * | 7/2011 | Elazar et al. | 713/165 |
| 8,000,474 B1 * | 8/2011 | Evans et al. | 380/205 |
| 8,060,930 B2 * | 11/2011 | Lovat et al. | 726/19 |

(Continued)

*Primary Examiner* — Arvin Eskandarnia
*Assistant Examiner* — Margishi Desai
(74) *Attorney, Agent, or Firm* — Wolfe-SBMC

(57) ABSTRACT

Various embodiments of a system and method for a single request and single response authentication protocol are described. A client may send to an authentication server a request to authenticate the identity of a user attempting to access an electronic document protected by a rights management policy. The single request may be generated according to rights management configuration information included within the document. Such rights management information may include one or more parameters for requesting authentication from an authentication server. In response to the request, an authentication server may send a single response to the client. The single response may include information indicating that the identity is authenticated (e.g., a license to access the document, or an encryption key to decrypt the document). The client system may be configured to, in response to the single response, provide access to the document according to the rights management policy.

36 Claims, 7 Drawing Sheets

(56) References Cited

U.S. PATENT DOCUMENTS

| | | | |
|---|---|---|---|
| 8,424,056 B2* | 4/2013 | Naganuma | 726/2 |
| 2002/0174073 A1* | 11/2002 | Nordman et al. | 705/64 |
| 2002/0178271 A1* | 11/2002 | Graham et al. | 709/229 |
| 2004/0128555 A1* | 7/2004 | Saitoh et al. | 713/201 |
| 2004/0153649 A1* | 8/2004 | Rhoads et al. | 713/176 |
| 2005/0177716 A1* | 8/2005 | Ginter et al. | 713/157 |
| 2006/0043164 A1* | 3/2006 | Dowling et al. | 235/375 |
| 2006/0080535 A1* | 4/2006 | Elazar et al. | 713/176 |
| 2006/0265599 A1* | 11/2006 | Kanai | 713/182 |
| 2007/0094311 A1* | 4/2007 | Pelletier et al. | 707/204 |
| 2007/0136673 A1* | 6/2007 | Minamida | 715/751 |
| 2008/0060083 A1* | 3/2008 | Koved et al. | 726/27 |
| 2008/0112405 A1* | 5/2008 | Cholas et al. | 370/389 |
| 2008/0140554 A1* | 6/2008 | Christy et al. | 705/35 |
| 2008/0222734 A1* | 9/2008 | Redlich et al. | 726/26 |
| 2009/0037339 A1* | 2/2009 | Ancell et al. | 705/72 |
| 2009/0165084 A1* | 6/2009 | Saito | 726/1 |
| 2009/0192942 A1* | 7/2009 | Cottrille et al. | 705/59 |
| 2009/0307753 A1* | 12/2009 | Dupont et al. | 726/3 |
| 2010/0125891 A1* | 5/2010 | Baskaran | 726/1 |
| 2011/0023083 A1* | 1/2011 | Eom et al. | 726/1 |
| 2011/0153696 A1* | 6/2011 | Saxena et al. | 707/827 |
| 2012/0084375 A1* | 4/2012 | Haskins et al. | 709/206 |
| 2012/0203795 A1* | 8/2012 | Ackerman et al. | 707/770 |

* cited by examiner

SYSTEM AND METHOD FOR A SINGLE REQUEST AND SINGLE RESPONSE AUTHENTICATION PROTOCOL

BACKGROUND

1. Field of the Invention

The present invention is directed to computer systems. More particularly, it is directed to protocol(s) for authentication in computing environments.

2. Description of the Related Art

In enterprise environments, electronic documents can provide various advantages over their hard copy counterparts. For instance, instead of physically delivering hard copy documents to intended recipients (e.g., via mail or courier services), authors can send recipients electronic versions of such documents through electronic channels, such as electronic mail ("email"), corporate intranets, and/or the Internet. Organizations relying on electronic document distribution may realize savings via reduced expenditures associated with printing and delivery. Due to its swiftness, electronic distribution of documents has in many cases become a preferred method of document delivery for many organizations (including businesses and customers alike). For instance, instead of waiting days or weeks (e.g., for international shipment), recipients can in many cases receive electronic documents virtually instantly (e.g., seconds or minutes).

In light of the ubiquitous nature of the Internet, email, and other electronic distribution methods, document management and security has become an increasing concern for organizations. For instance, sensitive documents that would have been previously limited to secure locations (e.g., a secure office building or client location) can now be easily (and sometimes mistakenly) sent electronically to individuals all over the world. Examples of sensitive documents may include documents associated with intellectual property, engineering designs, and confidential business strategies. One way in which businesses have confronted the unique challenges of electronic documents containing sensitive information includes document encryption.

SUMMARY

Various embodiments of a system and method for a single request and single response authentication protocol are described. Various embodiments may include a client system configured to receive an attempt to access an electronic document protected by a rights management policy. In various embodiments, the electronic document may include rights management configuration information that specifies one or more authentication parameters for authenticating the electronic document with a remote server. Examples of authentication parameters may include authentication mechanisms (e.g., password-based authentication, certificate-based authentication, and other authentication mechanisms), authentication server capabilities, as well as privacy notices to be displayed (e.g., displayed to a user attempting to access a rights protected document).

The client system may also be configured to send to the remote server, a single request to authenticate an identity of an entity (e.g., a user) attempting to access the electronic document. The single request may in various embodiments be generated according to the rights management configuration information included within the document. The client system may be further configured to, in response to sending the single request, receive a single response from the remote server. The single response may include information indicating that the identity is authenticated (e.g., a license to access the document, an encryption key to decrypt the document, or other information). The client system may be configured to, in response to the single response, provide access to the document according to the rights management policy.

Various embodiments may include an authentication server configured to receive a single request to authenticate an identity of an entity attempting to access an electronic document protected by a rights management policy. In various embodiments, the single request may be generated according to rights management configuration information stored within the electronic document. The authentication server may also be configured determine whether the single request adheres to one or more of the server's authentication requirements. For instance, the server may require that a particular authentication mechanism (e.g., password-based authentication, certificate-based authentication, and other authentication mechanisms) be utilized when requesting authentication from the server. The authentication server may be further configured to, in response to determining that the single request adheres to the one or more authentication requirements, send to a remote client a single response including information indicating that the identity is authenticated (e.g., a license to access the document, an encryption key to decrypt the document, or other information).

Figure 1:
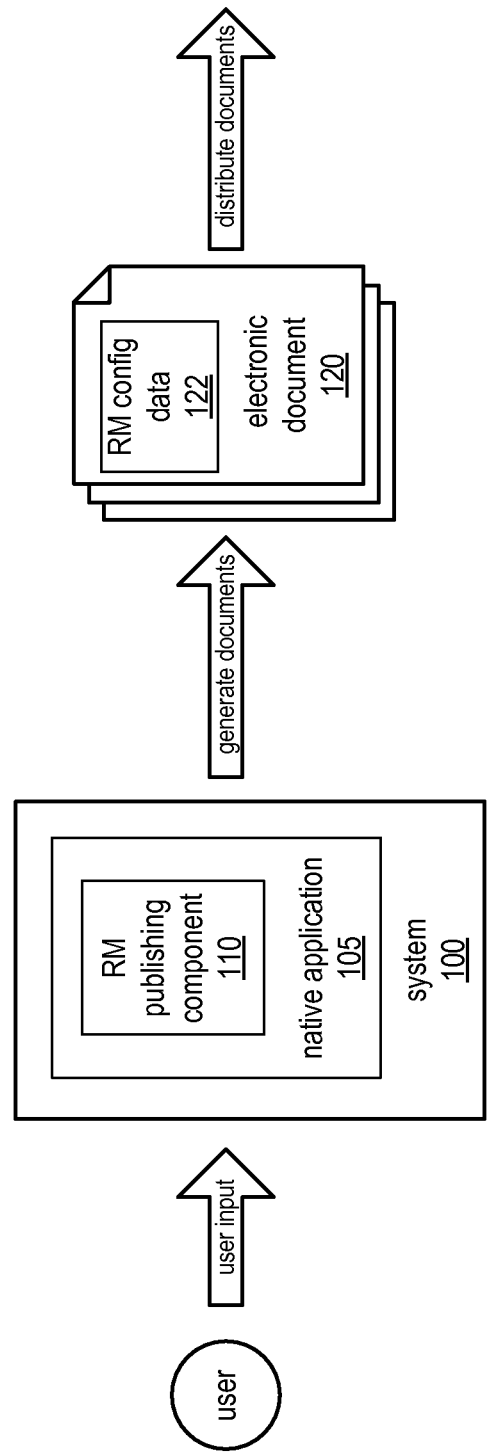
FIG. 1 illustrates a flow diagram of the generation of electronic documents, according to some embodiments.

While the system and method for a single request and single response authentication protocol is described herein by way of example for several embodiments and illustrative drawings, those skilled in the art will recognize that the system and method for a single request and single response authentication protocol is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for a single request and single response authentication protocol as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction

Various embodiments of a system and method for a single request and single response authentication protocol are described. In various embodiments, the single request and single response authentication protocol may be utilized to authenticate a user (or groups of users) for access to electronic documents (or "digital documents"). In various embodiments, such electronic documents may be governed by one or more rights management policies, which may be specific to individual users or groups of users. For instance, a rights management policy applied to an electronic document may prevent unauthorized individuals from accessing the document. For instance, the electronic document may be encrypted and protected by a username and password authentication scheme. For individuals that are authorized by the rights management policy to access the electronic document (e.g., users that provide a legitimate username and password), the rights management may specify the level of access that the individual will have with respect to the electronic document. For instance, the rights management policy may specify that a particular user may have one or more of the ability to read or view the electronic document, the ability to change or modify the electronic document, the ability to copy from or paste to the electronic document, the ability to print or otherwise convert the electronic document to a hard copy document, and/or the ability to access the document "offline" (described in more detail below). The functionality to apply a rights management policy may in various embodiments be implemented by a publishing component, which may be a stand alone application or a component of an application, as described in more detail herein.

The publishing component may be implemented as a component of a variety of native applications. Examples of native applications include document editors and viewers (e.g., Adobe® Acrobat® or Adobe® Reader® produced by Adobe Systems Incorporated), word processing applications, spreadsheet applications, presentation applications, computer-aided design (CAD) applications, and other types of applications configured to access, modify, and/or generate electronic documents. In some embodiments, the publishing component may be a plug-in or application extension configured to operate in conjunction with the native application. For a given document generated by the native application, the publishing component may be configured to embed (e.g., store) within the document data (or within metadata associated with the document) rights management information specifying one or more portions of a rights management policy applied to the document. In some embodiments, the act of applying a rights management policy to an electronic document may include such embedding.

In some embodiments, the rights management information defining the rights management policy may be wholly confined within the document data. However, in many cases, a portion of such rights information may be embedded in the document and another portion of the rights information may be stored at another location, such as on a remote computer system. One example of such a remote computer system includes one or more computer systems configured with a rights management server (e.g., an authentication server), as described in more detail herein. In a distributed rights management configuration, rights management servers may (among other things) control client access to rights management policies for particular documents, provide functionality for establishing or authenticating a user's credentials, and/or provide a framework for electronic document publishers (and other authorized individuals) to manage rights management policies associated with various electronic documents. Additional functionality of the rights management server is described in more detail below.

As used herein, a "published document" may include any generated electronic document to which a rights management policy has been applied. Published documents may be distributed through a variety of channels including but not limited to email, computer networks (e.g., a document published to a corporate intranet or the Internet), and physical mediums (e.g., compact discs, flash memory, etc.). In general, such channels may include any channel configured to transport electronic data. In various embodiments, published documents may be accessed via any application configured with a rights management client. The rights management client may be configured to enforce the rights management policy(ies) of a published document when a client application attempts to access the published document. In various embodiments, the rights management client may be a plug-in or application extension configured to operate in conjunction with an application configured to access the electronic document. Similar to the native applications described above, the client applications in which the rights management client may be implemented may include document editors and viewers, word processing applications, spreadsheet applications, presentation applications, CAD applications, and other types of applications configured to access, modify, and/or generate electronic documents. Note that in various embodiments the native application in which the published document was generated may be, but need not be, the same (or same type of) application as the client application.

In various embodiments, the rights management information embedded within a given document (and/or metadata associated with that document) may specify that a user's credentials are to be authenticated with a rights management server, such as the rights management server described above. When a user (or other entity) attempts to access such a file with a client application configured with a rights management client, the rights management client may perform an authentication protocol with a rights management server. (Note that in various embodiments an application may be required to have a rights management client in order to access a published document.) In various embodiments, the rights management server may be located remotely with respect to the rights management client. Accordingly, the aforesaid authentication protocol may be implemented over one or more computer networks including but not limited to local area networks (LANs) (e.g., corporate or Ethernet networks), wide area networks (WANs) (e.g., the Internet), and/or some combination thereof. In one particular embodiment, the rights management server may be implemented as part of a web server or other network-based server.

In conventional systems, such authentication protocols require multiple roundtrip (e.g., back and forth) communications between clients and servers tasked with rights management. Such back and forth communication between clients and servers increases latency for a given document session (e.g., a period of time that a user is accessing a document) on the client. Furthermore, conventional systems compound this latency on the server side since the server may be performing multiple authentication protocols with multiple clients. As described in more detail herein, various embodiments may prevent such multiple roundtrip communications between rights management clients and rights management servers. For at least some of (and in some cases a majority of) the performances of the authentication protocol, authentication may in various embodiments be carried out between the rights management client and the rights management server in a single request and single response fashion (described in more detail below). By authenticating user credentials with a single request and single response protocol, latency associated with authentication may be reduced for the client application. Likewise, this latency reduction may be compounded for the rights management server since the rights management server may in some embodiments perform the authentication with multiple different rights management clients. Accordingly, the authentication bandwidth of the rights management server (e.g., the number of user credentials a rights management server can authenticate per given unit of time) may be increased in various embodiments. Additionally, a single request and single response protocol simplifies load balancing schemes for the rights management servers (e.g., since the absence of multiple roundtrip requests relieves the load balancer of the duty of repeatedly sending such requests to the same server).

Note that performing a single request (e.g., one request sent from the rights management client to the rights management server) does not necessarily include sending only a single contiguous portion of data (although in some cases the request could be sent as a single contiguous portion of data). For instance, a single request may span multiple data packets (e.g., a portion of the request is sent within one data packet, and another portion of the request is sent with at least one other data packet). Likewise, performing a single response (e.g., one response sent from the rights management server to the rights management client) does not necessarily include sending only a single contiguous portion of data (although in some cases the response could be sent as a single contiguous portion of data). For instance, a single response may span multiple data packets (e.g., a portion of the request is sent within one data packet, and another portion of the request is sent with at least one other data packet). In various embodiments, all data representing the single request are transmitted to and/or received by the rights management server prior to the single response being transmitted to and/or received by the rights management client.

Further note that electronic documents may in various embodiments include stored data representing any of a variety of documents including but not limited to documents that include one or more of text, audio, video, multimedia, animations, metadata, configuration data or some combination thereof. Such documents may in various embodiments be stored in memory allocated to an application configured to view, modify, print, or otherwise access the document.

Document Publishing Phase

Figure 7:
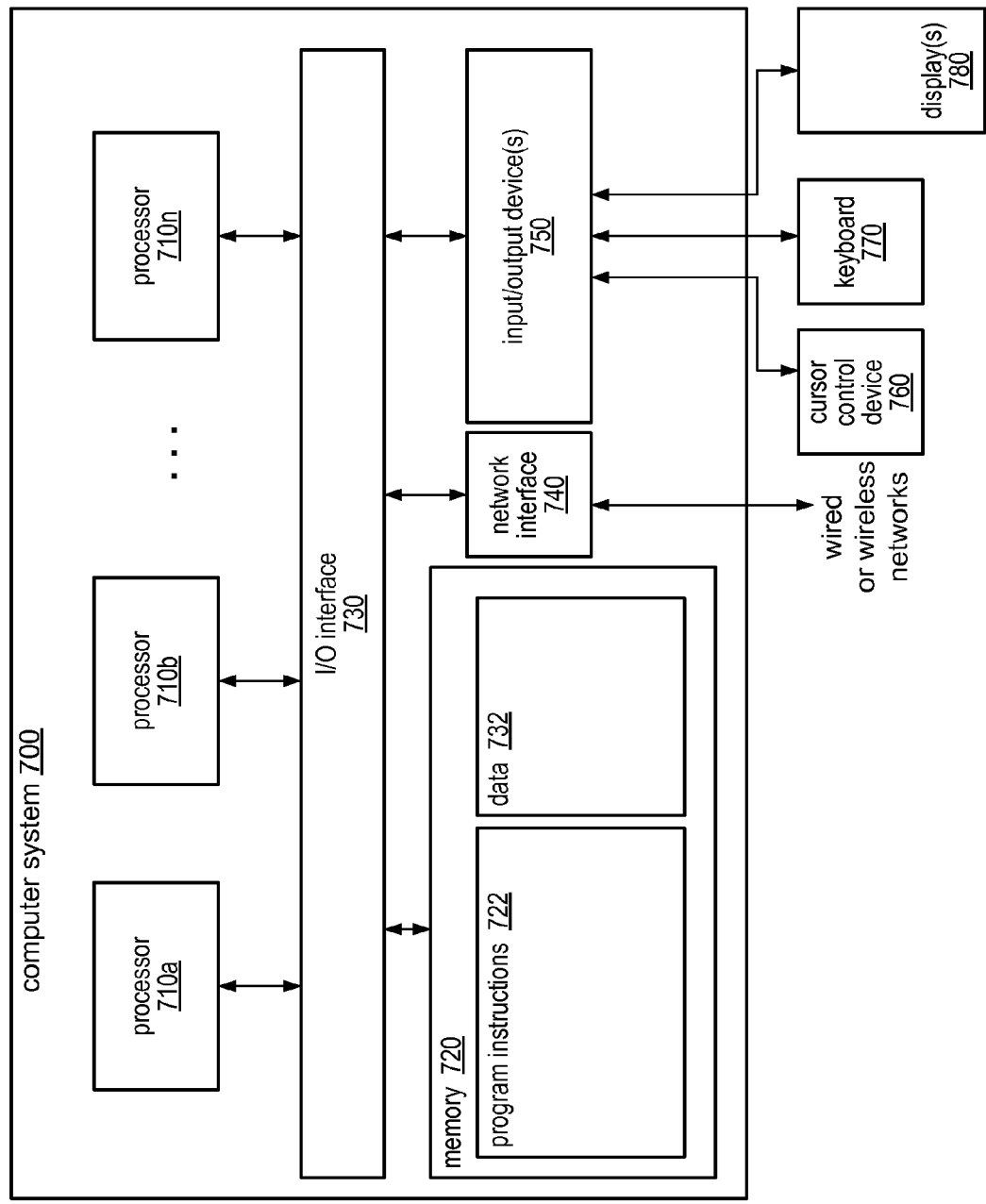
FIG. 7 illustrates a computing system suitable for implementing various elements of a system and method for a single request and single response authentication protocol, according to some embodiments.

FIG. 1 illustrates a flow diagram demonstrating the generation of one or more published documents (e.g., electronic document 120), according to some embodiments. As described above, a published document may include any generated electronic document to which a rights management policy has been applied. As illustrated, a native application 105 may execute on a computer system, such as system 100. One embodiment of a computer system configured to execute native application 105 is described below with respect to FIG. 7. Native application 105 may be any of a variety of applications configured to generate an electronic document including but not limited to document editors and viewers, word processing applications, spreadsheet applications, presentation applications, CAD applications, and other types of applications configured to access, modify, and/or generate electronic documents (e.g., application configured to playback or edit audio, video, and/or multimedia). As illustrated, native application 105 may be responsive to user input. For example, a finance author might type a new chapter of a personal finance book, a sales engineer might create a presentation to pitch to potential clients, or a design engineer might draft a manufacturing part in a CAD application. Note that in various embodiments, native application 105 may generate electronic documents without such user input.

In various embodiments, documents generated via native application 105 may include sensitive information. Examples of such sensitive information may include intellectual property, engineering designs, and confidential business strategies. Another example of sensitive information may include personally identifiable information (PII). In various embodiments, PII may include any piece of information that can potentially be used to identify, contact, or locate a specific person, such as a driver's license number, e-mail address, telephone number, or Social Security number.

A rights management publishing component (illustrated as RM publishing component 110) may be configured to apply a rights policy to the generated documents 120. In various embodiments, applying a rights management policy to the generated documents 120 may include the rights management publishing component embedding within the document rights management information specifying one or more portions of a rights management policy. Such embedded rights management information is illustrated in FIG. 1 as RM configuration data 122. In various embodiments, rights management configuration data 122 may be stored within the data representing document 120 (e.g., as document metadata). Applying a rights management policy to an electronic document may prevent unauthorized individuals from accessing the document. For instance, the electronic document may be encrypted and protected by a username and password authentication scheme. Furthermore, for each individual (or groups of individuals) authorized by the rights management policy to access the electronic document, the rights management policy may specify the level of access that the individual will have with respect to the electronic document. For instance, the rights management policy may specify that a particular user may have one or more of the ability to read or view the electronic document, the ability to change or modify the electronic document, the ability to copy from or paste to the electronic document, and/or the ability to print or otherwise convert the electronic document to a hard copy document. Other combinations of the above described rights are possible and contemplated.

In some embodiments, the rights management information embedded by the publishing component may specify that a particular individual or group of individuals are authorized to access electronic document 120 "offline." Such authorization may be referred to as an "offline lease" for the document. Such offline lease may specify a particular period of time (e.g., 30 minutes, 5 days, or any other specified period of time) in which the document will remain accessible without network based authentication.

In various embodiments, rights management configuration data 122 may specify that network-based authentication may be required in order to authenticate a user's credentials (i.e., authenticate the user's identity). Authenticating user credentials may prevent an unauthorized individual from impersonating an authorized individual and attempting to access an electronic document with the same privileges set forth for the authorized individual. Network-based authentication may include requesting from an authenticating server a license for the electronic document stored on the client system. If authentication is successful, the authenticating server may provide the client system with a license for the electronic document (e.g., an encryption key with which to decrypt the electronic document). The publishing component may in various embodiments specify within configuration data 122 the location of a rights management server with which an authentication protocol is to be performed, such as a Uniform Resource Identifier (URI) or Uniform Resource Locator (URL). In conventional systems, embedded configuration information associated with network-based authentication is typically sparse, sometimes including only the location of a server with which to perform authentication. For each authentication, such conventional systems rely heavily on several different round trip messages exchanged between the server system and the client system. Such messages may specify various parameters for performing authentication with the server system. As described in more detail with respect to the document consumption phase, various embodiments may include storing within rights management data 122 the requisite authentication parameters for network-based authentication such that network-based authentication (e.g., establishing a user's credentials so they can access the electronic document) may in many cases be performed with a single authentication request and a single authentication response. By authenticating user credentials with a single request and single response protocol, latency associated with authentication may be reduced for the client application. This latency reduction may be compounded for the rights management server since the rights management server may in some embodiments perform the authentication with multiple different rights management clients. Accordingly, the authentication bandwidth of the rights management server (e.g., the number of user credentials a rights management server can perform per given unit of time) may be increased in various embodiments.

In various embodiments, the rights management publication component 110 may be responsive to user input. For instance, the user (e.g., the document author) may select one or more predefined rights management policies that are to be enforced on the generated document 120. In other cases, publishing component 110 may enable a user to create a custom rights management policy. In various embodiments, the user may assign rights management policies to individuals or to groups of individuals. In other embodiments, the rights management publication component 110 may be configured to apply predefined and custom rights management policies automatically (e.g., without user input or intervention).

As illustrated, one or more of the generated documents may be distributed electronically. Such published documents may be distributed through a variety of channels including but not limited to email, computer networks (e.g., a document published to a corporate intranet or the Internet), and physical mediums (e.g., compact discs, flash memory, etc.). For instance, a financial advisor might send a client a year-end financial report via email. In another example, an architecture firm might mail to a construction contractor electronic blueprints on compact disc. In general, such channels may include any distribution channel configured to transport electronic data.

Document Consumption Phase

Figure 2:
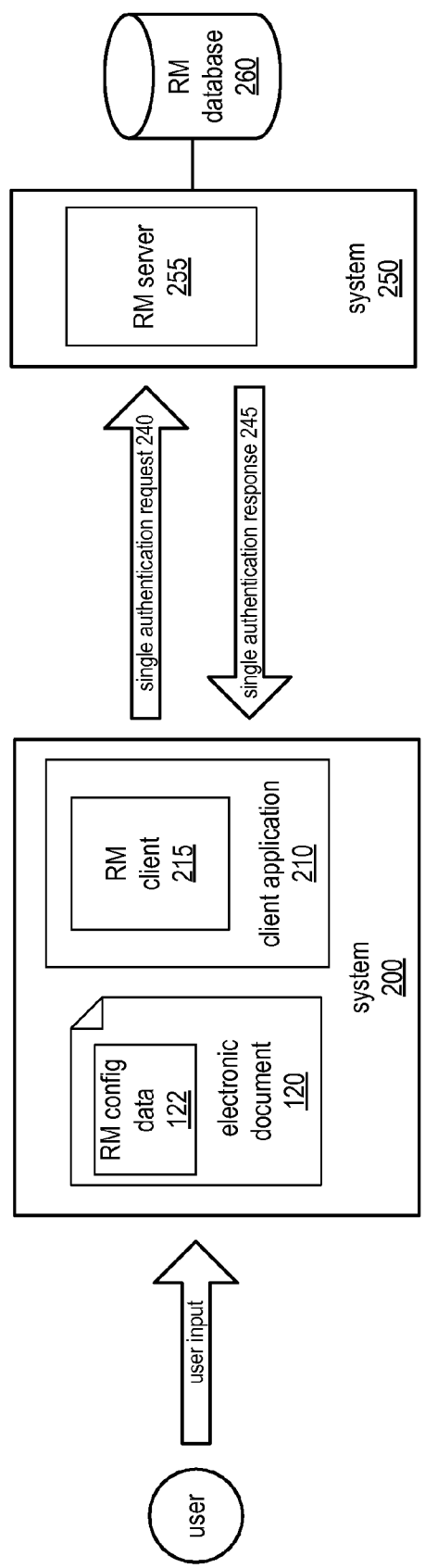
FIG. 2 illustrates a flow diagram of an authentication protocol for performing authentication with a single request and a single response, according to some embodiments.

FIG. 2 illustrates a data flow diagram for network-based authentication of published documents, such as electronic document 120. In the illustrated embodiment, a user may attempt to access electronic document 120 with client application 210. Client application 210 may include document editors and viewers, word processing applications, spreadsheet applications, presentation applications, CAD applications, and/or other types of applications configured to access, modify, and/or generate electronic documents. Note that in various embodiments the native application in which electronic document 120 was generated may be, but need not be, the same (or same type of) application as client application 210. In one example, the illustrated user may be a client of a financial advisor and electronic document 120 may be a year-end report of the client's retirement investments. In another example, the illustrated user may be a construction contractor and electronic document 120 may include one or more electronic blueprints.

Client application 210 may include a rights management client 215, which is illustrated as RM client 215. Rights management client 215 may be configured to enforce a rights management policy of electronic document 120 when client application 210 attempts to access the document (e.g., read, modify, and/or print the document). In various embodiments, rights management client 215 may be a plug-in or application extension configured to operate in conjunction with client application 210.

In various embodiments, rights management configuration data 122 may be configuration data embedded within document 120 by rights management publishing component 110 described above. In various embodiments, the rights management information embedded within configuration data 122 may specify a rights policy for the document. Such rights management policy may specify one or more users (and/or groups of users) that may access electronic document 120 upon properly authenticating their identities with rights management client 215. For each of such one or more users (and/or groups of users), the rights management policy may also specify the particular actions that the user may perform. For instance, the rights management policy may specify that a particular user may have one or more of the ability to read or view the electronic document, the ability to change or modify the electronic document, the ability to copy from or paste to the electronic document, and/or the ability to print or otherwise convert the electronic document to a hard copy document. For example, the rights management policy may specify that the author of the document has full read and write access to the document. In other examples, the rights management policy may specify that an auditor (e.g., government compliance auditor) has read access and print capabilities or that individual's of an "anonymous" group have read only access without print capabilities. Other combinations of the above described rights are possible and contemplated. In various embodiments, the rights management policy may include a digital signature and rights management client 215 may verify such signature (e.g., with a certificate authority) prior to enforcing the rights management policy.

The rights management configuration data 122 may in various embodiments specify that, before a user is granted access to electronic document 120 in accordance with the rights management policy specified by configuration data 122, a user's credentials are to be authenticated with a rights management server, such as rights management server 255 of system 250. Rights management server 255 may be configured to control client access to rights management policies for particular documents, provide functionality for establishing or authenticating a user's credentials, and/or provide a framework for electronic document publishers (and other authorized individuals) to manage rights management policies associated with various electronic documents. In various embodiments, the rights management client 215 and the rights management server may communicate over one or more networks including but not limited to LANs (e.g., corporate or Ethernet networks), WANs (e.g., the Internet) and/ or some combination thereof. In other embodiments, other network-based authentication protocols may be specified by rights management configuration data 122. In various embodiments (e.g., when the rights management policy has been digitally signed), the rights management client verify the authenticity of the rights management server's URL (e.g., verify the URL with a certificate authority) prior to communicating with the rights management server.

The rights management configuration data 122 may include one or more authentication parameters for authenticating the user's credentials with rights management server 255. In some embodiments, some of such parameters may be static parameters that do not change over time (or change very rarely). In one example, a static parameter may include usage or access rights (although, in some embodiments, such parameters may also be modified) of the rights management policy. Various other authentication parameters may include information that changes infrequently. In many cases, the inclusion of such parameters into configuration data 122 by the publishing component may enable rights management client 215 and rights management server 255 to perform authentication with only a single request and a single response. For instance, in conventional authentication systems, such infrequently changing information is transmitted between the client and the server via multiple roundtrip responses and requests during the authentication process. Such back and forth communication between the client and the server increases latency for a given document session on the client. Furthermore, conventional systems compound this latency on the server side since a single server may be performing multiple authentication protocols with multiple clients. The infrequently changing authentication parameters of configuration data 122 may include a variety of information including but not limited to the authentication mechanism to be used for authenticating the user's identity (e.g., username and/or password based authentication, certificate based authentication, and/or other authentication mechanisms), the server's version (and/or other information indicating one or more capabilities of the server), one or more URLs (e.g., URLs for redirecting the user to a specific web page for viewing information or providing authentication details), one or more privacy notification texts (e.g., a legal notice that information the user that their behavior with respect to the electronic document is being monitored), and various strings or text containing other information to be displayed to the user via the client application.

When the illustrated user attempts to access (e.g., open, read, modify, print or perform another function upon) electronic document 120 with client application 210, rights management client 215 may access the rights management configuration data 122 of electronic document 122. From such data, RM client 215 may determine that network-based authentication is to be performed in order to establish or authenticate the user's credentials (e.g., verify the user's identity). For instance, electronic data 122 may include a URL of a remote server (e.g., rights management server 255) with which an authentication protocol is to be performed in order to authenticate the user. Rights management client 215 may be configured to initiate such authentication with rights management server 255 according to the aforesaid authentication parameters, including the infrequently changing parameters (even though there is chance that such parameters have changed on the server side since the configuration data 122 was generated). In this way, rights management client 215 may "optimistically" attempt to initiate authentication with rights management server 255 by sending a single authentication request 240 according to one or more of such infrequently changing parameters.

For instance, rights management client 215 may initiate authentication with rights management server 255 according to the authentication mechanism indicated by the infrequently changing parameters. In one example, such authentication may be a type of username and password authentication. Accordingly, rights management client 215 may prompt the user (e.g., via a display) for a username and password, the user may provide such information as user input, and rights management client 215 may include such information within the illustrated single authentication request 240. Since the authentication mechanism is an infrequently changing authentication parameter, such request may be properly formatted and successfully received in most cases. If the infrequently changing parameters have not changed on the server side, rights management server 255 may successfully receive authentication request 240 and determine whether the username and password provided with the request. For instance, rights management server 255 may verify such information with respect to records in the illustrated rights management database. If rights management server 255 affirmatively verifies the user's identity, the rights management server may send a single authentication response 245 to rights management client 215. Response 245 may include a license to access electronic document 120 in accordance with the rights management policy set forth by configuration data 122. In one embodiment, such license may be an encryption key that may be used by rights management client 215 to decrypt the content of electronic document 120. In other cases, the license may indicate that the user has been authenticated and the client application may provide the user with access to document 120 (in accordance with the rights management policy set forth by configuration data 122) in response to receiving such license. Various other types of licenses (e.g., licenses including an expiration date or time, after which document access may be revoked) are possible and contemplated.

As described above, the inclusion of infrequently changing authentication parameters within configuration data 122 as well as the rights management application's ability to submit an authentication request in accordance with such parameters may enable rights management client 215 and rights management server 255 to perform authentication of a user with a single request and a single response. However, if the configuration parameters of the rights management server change, one or more of the infrequently changing parameters indicated by the rights management configuration data may need to be updated in accordance with the server's new configuration. For instance, the server may require a different authentication mechanism (e.g., certificate based authentication instead of username and password authentication), the server's version (and/or capabilities of the server) may be changed, one or more redirection URLs may be updated (e.g., URLs for redirecting the user to a specific web page for viewing information or providing authentication details), one or more privacy notification texts may be changed (e.g., notifications updated to reflect new privacy laws), and/or other parameters related to the authentication protocol to be performed by the rights management client and the rights management server.

Figure 3:
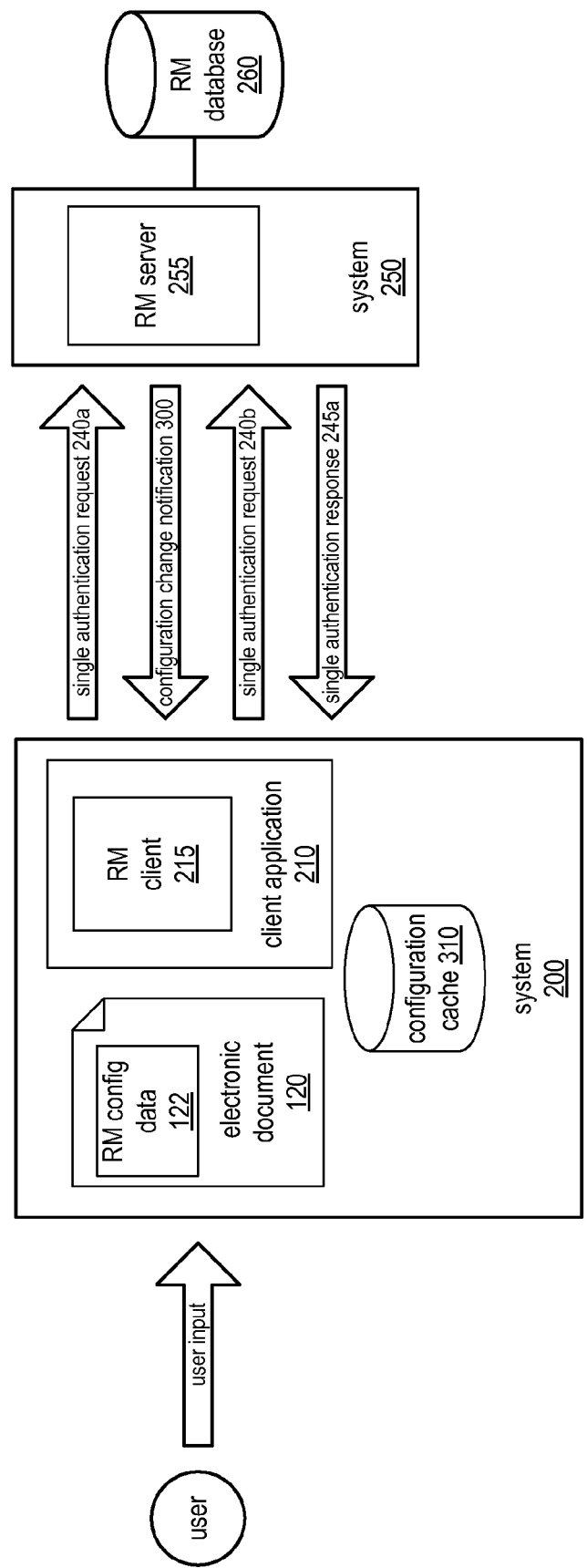
FIG. 3 illustrates a flow diagram of an authentication protocol for performing authentication when a configuration change is required, according to some embodiments.

FIG. 3 illustrates the performance of the authentication protocol when one or more infrequently changing parameters changes on the server side. In one example, rights management client may attempt to authenticate a user's credentials by sending a single authentication request 240*a* to rights management server 255, which may be substantially similar to (or the same as) authentication request 240 described above. For instance, configuration data 122 may specify that the authentication mechanism to be used is username and password-based authentication. Accordingly, single authentication request 240*a* may include a username and password obtained by querying the user. In the illustrated embodiment, the configuration of rights management server 255 with respect to one or more infrequently changing parameters may have changed.

In one example, instead of username and password-based authentication, rights management server 255 may be modified to specify that authentication is to be performed via a certificate based authentication scheme. Accordingly, single authentication request 240*a*, which does not adhere to a certificate-based authentication scheme in this example, may not be fully processed by rights management server 255. Instead, rights management server 255 may send a configuration change notification 300 to rights management client 215. Such configuration change notification 300 may specify one or more infrequently changing parameters that have changed. For instance, the configuration change notification may specify that the authentication mechanism to be used when authenticating a user with the server has changed from password-based authentication to certificate-based authentication. Rights management client 215 may be configured to modify rights management configuration data 122 in accordance with configuration change notification 300. For instance, rights management client 215 may change an authentication mechanism parameter from password-based authentication to certificate based authentication. Similar changes may be performed for other changes indicated by the configuration change notification. In some embodiments, in addition to or as an alternative to directly modifying rights management configuration data 122, rights management client 215 may modify a cached-version of such data that may be stored within the illustrated configuration cache 310. In various embodiments, configuration cache 310 may be protected by one or more data encryption schemes. Additionally, information within configuration cache 310 may be indexed by document. For instance, in various embodiments, the rights management client may be configured to search for rights information of an electronic document by searching the index of cache 310 with, e.g., a document identifier.

In various embodiments, rights management client 215 may be configured to check for configuration changes before sending an authentication request to rights management server 255. Accordingly, rights management client 215 may send a new single authentication request 240*b* in accordance with the rights management server's new configuration as specified by the updated configuration data (e.g., configuration data 122 or configuration data from configuration cache 310). Since authentication request 240*b* is structured according to the updated server configuration in the illustrated example, rights management server 255 may successfully process the request and transmit to the rights management client a single authentication response 245. Response 245 may include a license to access electronic document 120 in accordance with the rights management policy set forth by configuration data 122. In one embodiment, such license may be an encryption key that may be used by rights management client 215 to decrypt the content of electronic document 120. In other cases, the license may indicate that the user has been authenticated and the client application may provide the user with access to document 120 (in accordance with the rights management policy set forth by configuration data 122) in response to receiving such license.

Note that the inclusion of infrequently changing authentication parameters within configuration data 122 as well as the rights management application's ability to optimistically submit an authentication request in accordance with the current configuration data 122 stored at the client (e.g., submitting a request under the assumption that the server's authentication parameters have not changed) may in various embodiments result in an authentication protocol that primarily operates according to the embodiment illustrated by FIG. 2. The embodiment illustrated by FIG. 3 may in various embodiments be performed only when parameters that do not change often actually change on the server side. Once the configuration data is updated to reflect updated parameters as described above, the authentication protocol may return to the single request and single response mode of operation illustrated by FIG. 2. In various embodiments, the above described configuration may provide network performance advantages (e.g., with respect to load and throughput) over conventional protocols that include, for each authentication to be performed, multiple round trip requests for information (e.g., authentication parameters) sent from the client to the server and vice versa.

Note that in various embodiments, the performance of the system (from both a client perspective and a server perspective) may be monitored and the system may be updated or modified in accordance with performance changes. For instance, if it is determined that additional authentication parameters change only infrequently, such parameters may be added to the parameters stored in configuration data 122 or configuration cache 310.

Example Methods

Figure 4:
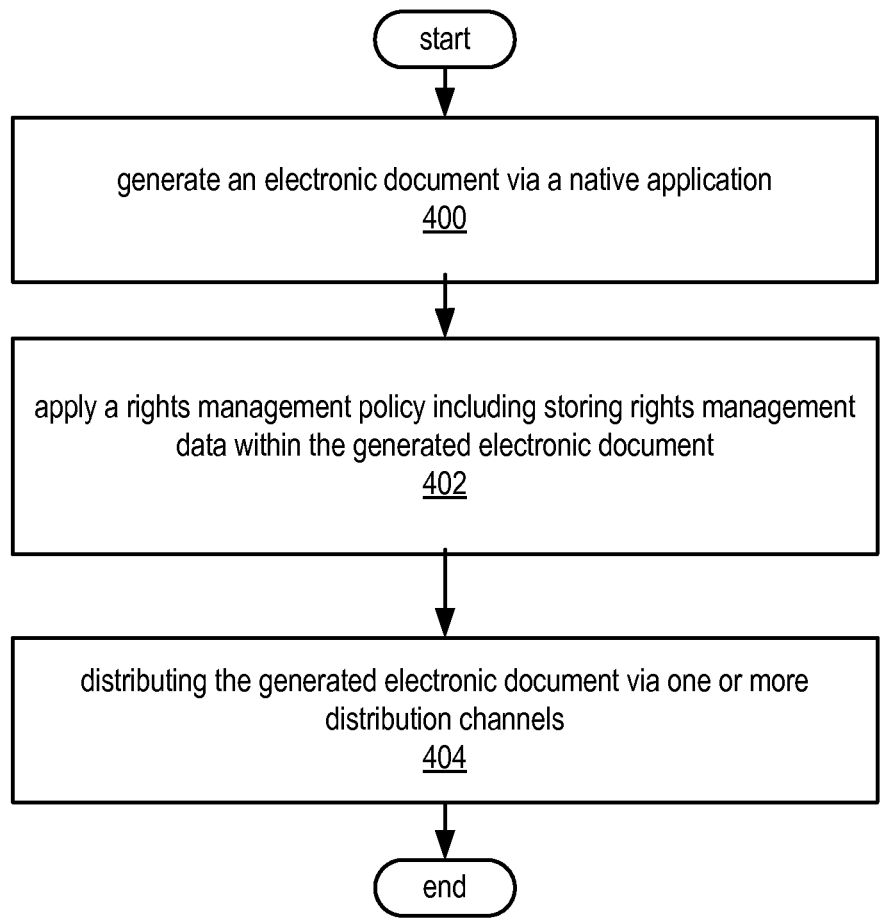
FIG. 4 illustrates a flowchart of the generation and distribution of electronic documents, according to some embodiments.

Various methods may be performed by the elements of the system and method for a single request and single response authentication protocol, examples of which are described below with respect to FIGS. 4 and 5. FIG. 4 illustrates a method for publishing a rights managed documents, such as one or more electronic documents 120 described above. In various embodiments, the illustrated method may be performed by a rights management publication component, such as rights management publication component 110 described above. As illustrated by block 400, the method may include generating an electronic document in a native application. As described above, examples of native applications include document editors and viewers, word processing applications, spreadsheet applications, presentation applications, CAD applications, and other types of applications configured to access, modify, and/or generate electronic documents. Furthermore, examples of electronic documents include documents that include one or more of text, audio, video, multimedia, animations, metadata, configuration data or some combination thereof. In some embodiments, the method may include generating an electronic document in response to user input. For instance, a finance author might type a new chapter of a personal finance book, a sales engineer might create a presentation to pitch to potential clients, or a design engineer might draft a manufacturing part in a CAD application. Note that in various embodiments the method may include generating electronic documents without such user input. As described above, generating an electronic document may include generating a document that includes sensitive information, such as intellectual property, engineering designs, and confidential business strategies, or PII.

As illustrated by block 402, the method may further include applying a rights management policy to the generated electronic document. In various embodiments, applying a rights management policy to the generated document may include storing rights management data with the document (e.g., within metadata of the document). One example of rights information includes rights management configuration data 122 described above. Rights management information may include a rights management policy that specifies access rights (e.g., specifies which users or groups of users can access the document) as well as usage rights (e.g., for each of such users or groups of users, one or more actions the user or group is permitted to perform with respect to the document). For example, the method may include specifying different access rights for the document author, a document auditor, and an "anonymous" group. Examples of usage rights include one or more of the ability to read or view the electronic document, the ability to change or modify the electronic document, the ability to copy from or paste to the electronic document, the ability to print or otherwise convert the electronic document to a hard copy document, and/or the ability to access the document offline.

In various embodiments, the method may include storing within the document authentication parameters for authenticating a user's credentials with a remote server. In some embodiments, some of such parameters may be static parameters that do not change over time (or change very rarely). In one example, a static parameter may include usage or access rights. Various other authentication parameters may include information that changes infrequently. In many cases, the inclusion of such parameters into the document may enable a rights management client and a rights management server to perform authentication with only a single request and a single response, the effects of which are described in more detail above. The method may include storing various infrequently changing authentication parameters within the document including but not limited to the authentication mechanism to be used for authenticating the user's identity (e.g., username and/or password based authentication, certificate based authentication, and/or other authentication mechanisms), the server's version (and/or other information indicating one or more capabilities of the server), one or more URLs (e.g., URLs for redirecting the user to a specific web page for viewing information or providing authentication details), one or more privacy notification texts (e.g., a legal notice that information the user that their behavior with respect to the electronic document is being monitored, and various strings or text containing other information to be displayed to the user via the client application.

As illustrated by block 404, the method may further include distributing the electronic document via one or more distribution channels. Such channels may include but are not limited to email, computer networks, and physical mediums. In general, such channels may include any channel configured to transport electronic data. In various embodiments, the distributed documents may be accessed via any application configured with a rights management client, which may enforce the rights management policy of the document when a client application attempts to access the published document.

Figure 5:
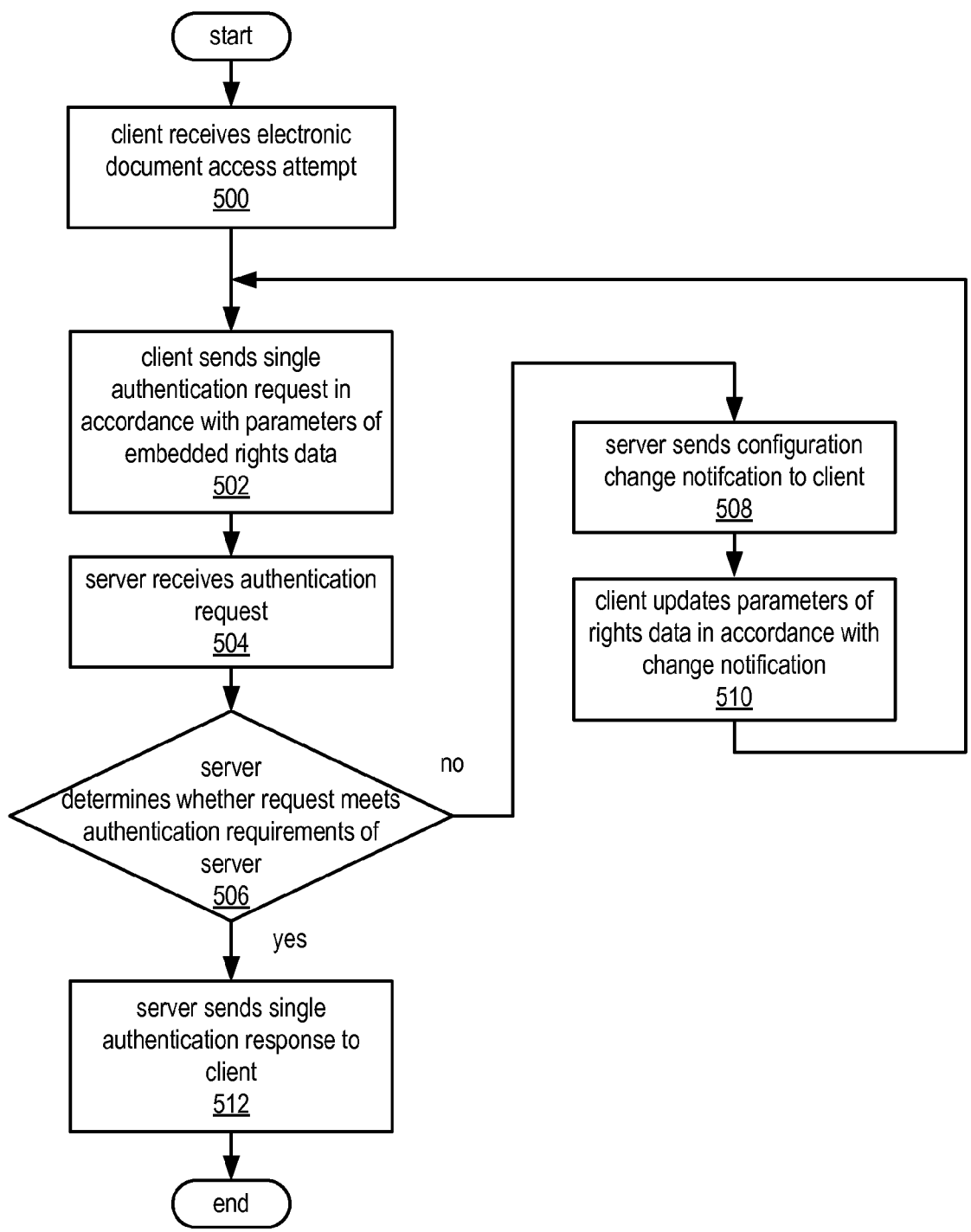
FIG. 5 illustrates a flow diagram of an authentication protocol for authenticating user credentials, according to some embodiments.

FIG. 5 illustrates one method for the consumption of electronic documents, such as electronic documents generated according to the method of FIG. 4. Various portions of the illustrated method may be performed by the rights management client or the rights management server described above. As illustrated by block 500, the method may begin by the rights management client (or simply "client) detecting a document access attempt. For instance, the client may detect that a user is attempting to view, modify, or print the electronic document. As described above, such document may include rights management data, one example of which includes rights management configuration data 122 described above. As illustrated by block 502, the client may send a single authentication request (e.g., a request to authenticate a user's credentials) in accordance with authentication parameters of the rights information embedded in the document. Examples of authentication parameters are described above. In one example, an authentication parameter may specify that authentication is to be performed via, e.g., username and password authentication. In such example, the client may query the user attempting to access the document for a valid username and password and include such information within the request that it sends to the rights management server (or simply "server"). Various other examples of parameters are described above; the single request sent by the client to the server may conform to any of such parameters. In various embodiments, sending an authentication request may include sending the request via one or more networks including LANs, WANs, or some combination thereof.

The server may receive the request (block 504) and determine whether the request meets authentication requirements of the server (block 506). For instance, the server may determine whether the request conforms to various parameters according to which the server operates including but not limited to the authentication mechanism to be used for authenticating the user's identity (e.g., username and/or password based authentication, certificate based authentication, and/or other authentication mechanisms), the server's version (and/or other information indicating one or more capabilities of the server), one or more URLs (e.g., URLs for redirecting the user to a specific web page for viewing information or providing authentication details), one or more privacy notification texts (e.g., a legal notice that information the user that their behavior with respect to the electronic document is being monitored, and various strings or text containing other information to be displayed to the user via the client application. As described above, such parameters may be embedded within the document during the publishing phase. Accordingly, in many cases, a request generated according to such information will meet the parameter requirement set forth by the server as long as such parameters have not changed since the document was created (or since the last time the rights management configuration data of the document was updated in accordance with the server's settings, described below).

As illustrated by block 512, the server may send a single authentication response to the client if it is determined that the request meets the requirements of the server, as illustrated by the positive output of block 506. Since the requirements of the server (e.g., the authentication parameters) may change only infrequently in many cases, the complete authentication process may in many cases be performed with only a single request and a single response. By authenticating user credentials with a single request and single response protocol, latency associated with authentication may be reduced for the client. This latency reduction may be compounded for the server since the rights management server may perform the authentication with multiple different clients. By employing the methods described herein, the authentication bandwidth of the server (e.g., the number of user credentials a server can perform per given unit of time) may be enhanced in various embodiments. Additionally, a single request and single response protocol simplifies load balancing schemes for the server(s) (e.g., since the absence of multiple roundtrip requests relieves the load balancer of the duty of repeatedly sending such requests to the same server).

In a relatively small percentage of cases (e.g., since the particular authentication parameters of the server do not frequently change), the server may determine that the request does not meet authentication parameter requirements of the server, as illustrated by the negative output of block 506. For instance, if the request conforms to a username and password authentication scheme while the client requires certificate based authentication, the server may determine that the request does not meet authentication parameter requirements of the server. In other embodiments, other authentication parameters (e.g., server version, redirection URLs, privacy notices, etc.) may be evaluated in a similar manner. In these cases, as illustrated by block 508, the server may send a configuration change notification to the client. One example of a configuration change notification is described above with respect to configuration change notification 300. The configuration change notification sent to the client may specify one or more infrequently changing parameters that have changed. For instance, the configuration change notification may specify that the authentication mechanism to be used when authenticating a user via the server has changed from password-based authentication to certificate-based authentication. In other examples, changes to any of the other authentication parameters may be specified by the configuration change notification sent to the client. As illustrated by block 510, the client may be configured to update or modify the parameters of the rights management data of the document (e.g., configuration data 122 described above) to reflect the changes that have occurred at the server. For instance, if the authentication mechanism required by the server has changed from password-based authentication to certificate-based authentication, the client may modify the authentication parameters of the document's rights management configuration data accordingly. At this point, the method may continue to blocks 504, 506 and 512, where the server may send a single response back to the client since the authentication parameters used by the client match the authentication parameters of the server.

In various embodiments, the response provided by the server to the client may include a license to access the electronic document in accordance with the rights management policy set forth by configuration data of the document. In some embodiments, such license may be an encryption key that may be used by rights management client 215 to decrypt the content of electronic document 120. In other cases, the license may indicate that the user has been authenticated and the client application may provide the user with access to document 120 (in accordance with the rights management policy set forth by configuration data 122) in response to receiving such license.

Example System Configuration

Figure 6:
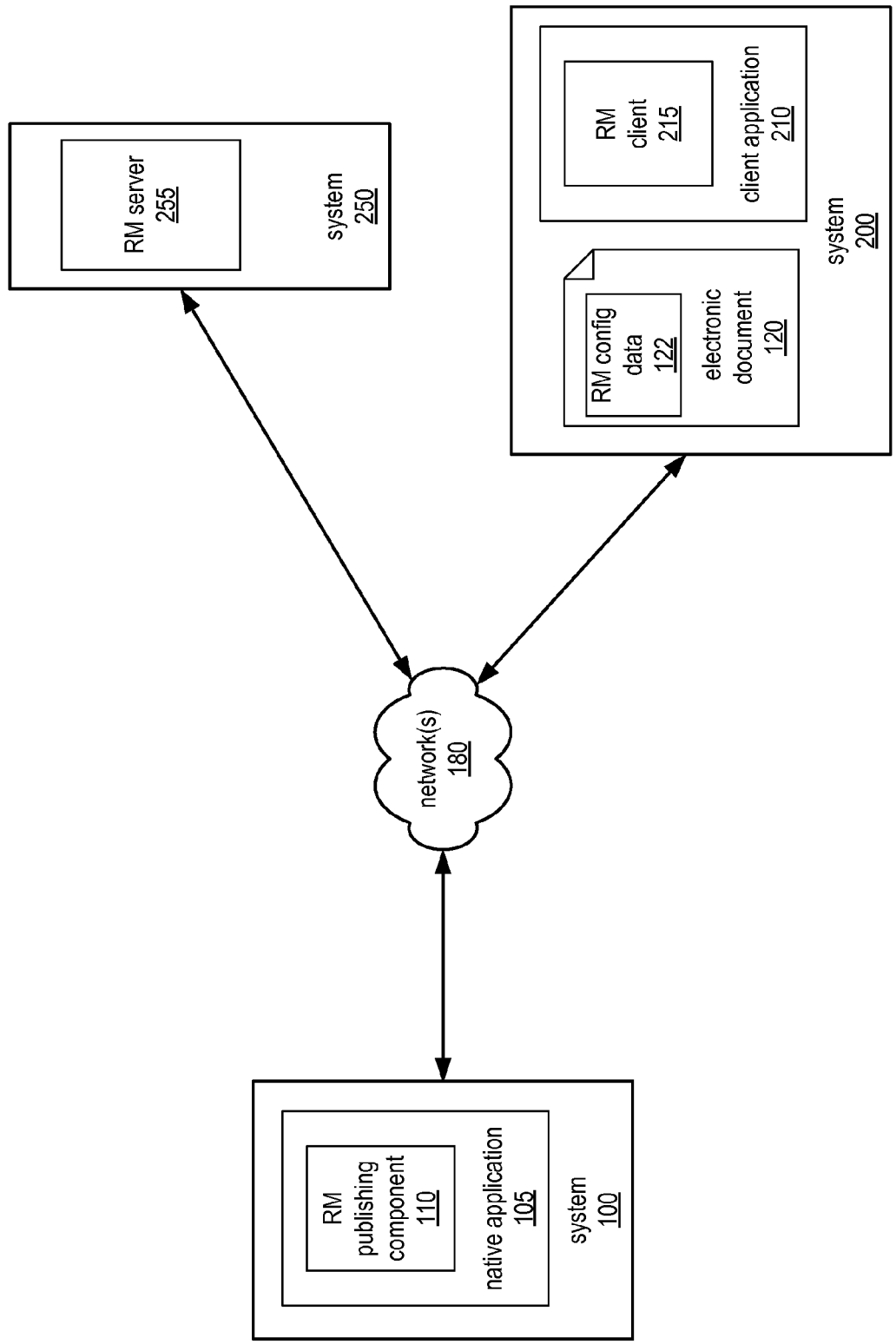
FIG. 6 illustrates an example system configuration, according to some embodiments.

FIG. 6 illustrates one example of a system configuration according to which elements of the system and method for a single request and single response authentication protocol may be implemented. In the illustrated embodiment, systems 100, 200, and 250 (described in more detail above) may each be configured to communicate to one another via one or more networks, such as network 180. In various embodiments, network 180 may include LANs, WANs, wireless data networks, other data networks, or some combination thereof. In alternative embodiments, native application 105 and client application 210 may execute on the same computer system. Further, in some embodiments, native application 105 and client application 210 may be the same application. In various embodiments, the various requests and responses (e.g., a single authentication request or a single authentication response, as described above) may be transmitted via one or more network(s) 180. Additionally, network(s) 180 may be configured to support any of the various electronic distribution channels (e.g., email, websites, etc.) that may be utilized to distribute electronic documents. In various embodiments, each of the illustrated computer systems (e.g., systems 100, 200 and 250) may be implemented by the example computer system described below with respect to FIG. 7.

Example Computer System

Various embodiments of a system and method for a single request and single response authentication protocol, as described herein, may be executed on one or more computer systems, which may interact with various other devices. One such computer system is computer system 700 illustrated by FIG. 7. Computer system 700 may be capable of implementing any of the above described computer systems (e.g., systems 100, 200, and 250) and applications (e.g., native application 105, client application 210, rights management client 215, rights management server 255). In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780 for interacting with various entities (e.g., receiving a username and password from a user). In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more of native application 105, client application 210, rights management client 215, rights management server 255, are shown stored within system memory 720 as program instructions 722. Additionally, data representing one or more electronic documents 120 or rights management configuration information 122 are shown illustrated as data 732. In various embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 180), such as other computer systems (e.g., systems 100, 200, 250), or between nodes of computer system 700 (e.g., systems 100, 200, 250). In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In various embodiments, program instructions 722 may be executable by the processor to implement any portion of the various methods described herein, such as the methods illustrated by FIGS. 4 and 5. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure.

Realizations in accordance with various embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of various embodiments as defined in the claims that follow.

What is claimed is:

1. A computer-implemented method for authenticating credentials for access to a given electronic document having content protected by a given rights management policy and managed by a rights management client, comprising:

receiving an indication at the rights management client of an attempt to access the electronic document having the content protected by the rights management policy, wherein said electronic document comprises rights management configuration information embedded in the electronic document that specifies access rights with respect to the content that is protected and one or more authentication parameters for performing authentication with a remote server in regard to the electronic document, wherein the rights management configuration information from said electronic document indicates a particular authentication protocol to be performed for the authentication with the remote server;

responsive to the attempt to access the electronic document:
- the rights management client preventing access to the content of the electronic document protected by the rights management policy; and
- authenticating an identity of an entity attempting the access to the electronic document using a single request and single response protocol including:
  - sending to the remote server from the rights management client, the single request to authenticate the identity of the entity attempting the access to the electronic document, wherein said single request is generated according to said rights management configuration information from the electronic document; and
  - in response to sending the single request, receiving the single response from the remote server at the rights management client, wherein said single response comprises information indicating that said identity is authenticated; and
- in response to receiving the single response, the rights management client providing access to the electronic document and content that is protected according to said rights management configuration information embedded in the electronic document.

2. The computer-implemented method of claim 1, wherein the method further comprises:
- subsequent to said providing access to the document, receiving an other attempt to access the electronic document;
- sending to the remote server, an other single request to authenticate an identity of a given entity attempting to access the electronic document, wherein said other single request is generated according to said rights management configuration information;
- in response to sending the other single request, receiving a notification to change one or more authentication parameters of said rights management configuration information; and
- in response to said notification, changing at least some of said authentication parameters specified by said rights management configuration information.

3. The computer-implemented method of claim 2, further comprising:
- subsequent to changing at least some of said authentication parameters, sending to the remote server, an additional single request to authenticate the identity of the given entity attempting to access the electronic document, wherein said additional single request is generated according to the changed rights management configuration information;
- in response to sending the additional single request, receiving an other single response from the remote server, wherein said other single response comprises information indicating that said identity of the given entity is authenticated; and
- in response to the other single response, providing access to the document according to said rights management policy.

4. The computer-implemented method of claim 1, wherein said attempt to access the electronic document is one or more of: an attempt to view the electronic document, an attempt to modify the electronic document, and an attempt to print the electronic document.

5. The computer-implemented method of claim 1, wherein said information indicating that said entity is authenticated comprises a license to access said electronic document.

6. The computer-implemented method of claim 1, wherein said information indicating that said entity is authenticated comprises an encryption key for decrypting said electronic document, wherein said providing access to the document comprises utilizing the encryption key to decrypt said electronic document.

7. A computer-implemented method for authenticating credentials for access to a given electronic document having content protected by a given rights management policy and managed by a remote rights management client, comprising:
- receiving a single request from the rights management client to authenticate an identity of an entity attempting to access the electronic document having the content protected by the rights management policy, wherein said single request is generated according to rights management configuration information embedded within said electronic document that specifies access rights with respect to the content that is protected and indicates a particular authentication protocol for performing authentication in regard to the electronic document;
- determining whether the single request adheres to one or more authentication requirements of an authentication server; and
- in response to determining that the single request adheres to said one or more authentication requirements, sending to the remote rights management client a single response comprising information indicating that said identity is authenticated.

8. The computer-implemented method of claim 7, further comprising:
- subsequent to sending said information indicating that said identity is authenticated, receiving an other single request to authenticate an identity of a given entity attempting to access the electronic document; and
- in response to determining that the single request does not adhere to at least one authentication requirement of the authentication server, sending to a remote client a notification to change the rights management configuration information according to which authentication requests are generated.

9. The computer-implemented method of claim 8, wherein said notification to change specifies one or more authentication parameters that are to be changed.

10. The computer-implemented method of claim 9, wherein said authentication parameters include one or more of: a parameter specifying an authentication mechanism, a parameter specifying capabilities of the authentication server, and a parameter specifying a privacy notification to be displayed to a user.

11. The computer-implemented method of claim 7, wherein said information indicating that said entity is authenticated comprises a license to access said electronic document.

12. The computer implemented method of claim 7, wherein said information indicating that said entity is authenticated comprises an encryption key for decrypting said electronic document.

13. A system for authenticating credentials for access to a given electronic document having content protected by a given rights management policy and managed by a rights management client, the system comprising:
- a memory comprising program instructions;
- one or more processors coupled to said memory, wherein the program instructions are executable by at least one of said one or more processors to:
  - receive an indication at the rights management client of an attempt to access the electronic document having the content protected by the rights management policy, wherein said electronic document comprises rights management configuration information embedded in the electronic document that specifies access rights with respect to the content that is protected and one or more authentication parameters for performing authentication with a remote server in regard to the electronic document, wherein the rights management configuration information from said electronic document indicates a particular authentication protocol to be performed for the authentication with the remote server;

in response to the attempt to access the electronic document:

prevent, at the rights management client, access to the content of the electronic document protected by the rights management policy; and authenticate an identity of an entity attempting the access to the electronic document using a single request and single response protocol including:

send to the remote server from the rights management client, the single request to authenticate the identity of the entity attempting the access to the electronic document, wherein said single request is generated according to said rights management configuration information from the electronic document; and in response to sending the single request, receive the single response from the remote server at the rights management client, wherein said single response comprises information indicating that said identity is authenticated; and in response to receiving the single response, provide, at the rights management client, access to the electronic document and content that is protected according to said rights management configuration information embedded in the electronic document.

14. The system of claim 13, wherein the program instructions are configured to:

subsequent to said providing access to the document, receive an other attempt to access the electronic document;

send to the remote server, an other single request to authenticate an identity of a given entity attempting to access the electronic document, wherein said other single request is generated according to said rights management configuration information;

in response to sending the other single request, receive a notification to change one or more authentication parameters of said rights management configuration information; and in response to said notification, change at least some of said authentication parameters specified by said rights management configuration information.

15. The system of claim 14, wherein the program instructions are configured to:

subsequent to changing at least some of said authentication parameters, send to the remote server, an additional single request to authenticate the identity of the given entity attempting to access the electronic document, wherein said additional single request is generated according to the changed rights management configuration information;

in response to sending the additional single request, receive an other single response from the remote server, wherein said other single response comprises information indicating that said identity of the given entity is authenticated; and in response to the other single response, provide access to the document according to said rights management policy.

16. The system of claim 13, wherein said attempt to access the electronic document is one or more of: an attempt to view the electronic document, an attempt to modify the electronic document, and an attempt to print the electronic document.

17. The system of claim 13, wherein said information indicating that said entity is authenticated comprises a license to access said electronic document.

18. The system of claim 13, wherein said information indicating that said entity is authenticated comprises an encryption key for decrypting said electronic document, wherein to provide access to the document the program instructions are configured to utilize the encryption key to decrypt said electronic document.

19. A system for authenticating credentials for access to a given electronic document having content protected by a given rights management policy and managed by a remote rights management client, the system comprising:

a memory comprising program instructions;

one or more processors coupled to said memory, wherein the program instructions are executable by at least one of said one or more processors to:

receive a single request from the rights management client to authenticate an identity of an entity attempting to access the electronic document having the content protected by the rights management policy, wherein said single request is generated according to rights management configuration information embedded within said electronic document that specifies access rights with respect to the content that is protected and indicates a particular authentication protocol for performing authentication in regard to the electronic document;

determine whether the single request adheres to one or more authentication requirements of an authentication server; and in response to determining that the single request adheres to said one or more authentication requirements, send to the remote rights management client a single response comprising information indicating that said identity is authenticated.

20. The system of claim 19, wherein the program instructions are configured to:

subsequent to sending said information indicating that said identity is authenticated, receive an other single request to authenticate an identity of a given entity attempting to access the electronic document; and in response to determining that the single request does not adhere to at least one authentication requirement of the authentication server, send to a remote client a notification to change the rights management configuration information according to which authentication requests are generated.

21. The system of claim 20, wherein said notification to change specifies one or more authentication parameters that are to be changed.

22. The system of claim 21, wherein said authentication parameters include one or more of: a parameter specifying an authentication mechanism, a parameter specifying capabilities of the authentication server, and a parameter specifying a privacy notification to be displayed to a user.

23. The system of claim 19, wherein said information indicating that said entity is authenticated comprises a license to access said electronic document.

24. The system of claim 19, wherein said information indicating that said entity is authenticated comprises an encryption key for decrypting said electronic document.

25. A non-transitory computer accessible storage medium storing program instructions for authenticating credentials for access to a given electronic document having content protected by a given rights management policy and managed by a rights management client, the program instructions computer-executable to:
receive an indication at the rights management client of an attempt to access the electronic document having the content protected by the rights management policy, wherein said electronic document comprises rights management configuration information embedded in the electronic document that specifies access rights with respect to the content that is protected and one or more authentication parameters for performing authentication with a remote server in regard to the electronic document, wherein the rights management configuration information from said electronic document indicates a particular authentication protocol to be performed for the authentication with the remote server;
in response to the attempt to access the electronic document:
prevent, at the rights management client, access to the content of the electronic document protected by the rights management policy; and
authenticate an identity of an entity attempting the access to the electronic document using a single request and single response protocol including:
send to the remote server from the rights management client, the single request to authenticate the identity of the entity attempting the access to the electronic document, wherein said single request is generated according to said rights management configuration information from the electronic document; and
in response to sending the single request, receive the single response from the remote server at the rights management client, wherein said single response comprises information indicating that said identity is authenticated; and
in response to receiving the single response, provide, at the rights management client, access to the electronic document and content that is protected according to said rights management policy configuration information embedded in the electronic document.

26. The medium of claim 25, wherein the program instructions are configured to:
subsequent to said providing access to the document, receive an other attempt to access the electronic document;
send to the remote server, an other single request to authenticate an identity of a given entity attempting to access the electronic document, wherein said other single request is generated according to said rights management configuration information;
in response to sending the other single request, receive a notification to change one or more authentication parameters of said rights management configuration information; and
in response to said notification, change at least some of said authentication parameters specified by said rights management configuration information.

27. The medium of claim 26, wherein the program instructions are configured to:
subsequent to changing at least some of said authentication parameters, send to the remote server, an additional single request to authenticate the identity of the given entity attempting to access the electronic document, wherein said additional single request is generated according to the changed rights management configuration information;
in response to sending the additional single request, receive an other single response from the remote server, wherein said other single response comprises information indicating that said identity of the given entity is authenticated; and
in response to the other single response, provide access to the document according to said rights management policy.

28. The medium of claim 25, wherein said attempt to access the electronic document is one or more of: an attempt to view the electronic document, an attempt to modify the electronic document, and an attempt to print the electronic document.

29. The medium of claim 25, wherein said information indicating that said entity is authenticated comprises a license to access said electronic document.

30. The medium of claim 25, wherein said information indicating that said entity is authenticated comprises an encryption key for decrypting said electronic document, wherein to provide access to the document the program instructions are configured to utilize the encryption key to decrypt said electronic document.

31. A computer-implemented method for authenticating credentials for access to a given electronic document protected by a given rights management policy, comprising:
receiving an indication of an attempt to access the electronic document protected by the rights management policy, wherein said electronic document comprises rights management configuration information specifying one or more authentication parameters for performing authentication with a remote server in regard to the electronic document server, wherein the rights management configuration information from said electronic document indicates a particular authentication protocol to be performed for the authentication with the remote server;
sending to the remote server, a single request to authenticate an identity of an entity attempting to access the electronic document, wherein said single request is generated according to said rights management configuration information from the electronic document;
in response to sending the single request, receiving a single response from the remote server, wherein said single response comprises information indicating that said identity is authenticated and whether the authentication parameters of the rights management configuration information have changed; and
in response to the single response, providing access to the document according to said rights management policy and, if the authentication parameters of the rights management configuration information have changed, changing at least some of the authentication parameters specified by the rights management configuration information.

32. The computer-implemented method of claim 31, further comprising:
subsequent to changing at least some of the authentication parameters, sending to the remote server, an additional single request to authenticate the identity of the given entity attempting to access the electronic document, wherein the additional single request is generated according to the changed rights management configuration information;

in response to sending the additional single request, receiving an other single response from the remote server, wherein said other single response comprises information indicating that said identity of the given entity is authenticated; and in response to the other single response, providing access to the document according to said rights management policy.

33. The computer-implemented method of claim 31, wherein said attempt to access the electronic document is one or more of: an attempt to view the electronic document, an attempt to modify the electronic document, and an attempt to print the electronic document.

34. The computer-implemented method of claim 31, wherein said information indicating that said entity is authenticated comprises an encryption key for decrypting said electronic document, wherein said providing access to the document comprises utilizing the encryption key to decrypt said electronic document.

35. The computer-implemented method of claim 31, wherein said information indicating that said entity is authenticated comprises a license to access said electronic document.

36. The computer-implemented method of claim 31, wherein changes to the authentication parameters include changing an authentication mechanism, the remote server's version, redirection URLs, privacy notification texts, or other parameters related to the authentication protocol to be performed by the rights management client and the remote server.

* * * * *